US009386428B2

(12) United States Patent
Hwang

(10) Patent No.: US 9,386,428 B2
(45) Date of Patent: Jul. 5, 2016

(54) CALL FORWARDING APPARATUS AND METHOD

(71) Applicant: Samsung Electronics Co., Ltd, Gyeonggi-do (KR)

(72) Inventor: Chul-Hoon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 13/744,195

(22) Filed: Jan. 17, 2013

(65) Prior Publication Data

US 2013/0183950 A1    Jul. 18, 2013

(30) Foreign Application Priority Data

Jan. 17, 2012  (KR) .................. 10-2012-0005271

(51) Int. Cl.
*H04M 3/42* (2006.01)
*H04W 4/16* (2009.01)
*H04M 3/54* (2006.01)

(52) U.S. Cl.
CPC ............ *H04W 4/16* (2013.01); *H04M 3/42153* (2013.01); *H04M 3/54* (2013.01); *H04M 2250/04* (2013.01)

(58) Field of Classification Search
USPC ........................................................ 455/417
See application file for complete search history.

(56) References Cited

U.S. PATENT DOCUMENTS

| 2005/0215243 A1* | 9/2005 | Black et al. .................... 455/417 |
| 2007/0032225 A1* | 2/2007 | Konicek et al. ................ 455/417 |
| 2008/0032689 A1* | 2/2008 | Kubota et al. .................. 455/425 |

* cited by examiner

*Primary Examiner* — Joel Ajayi

(57) ABSTRACT

According to one embodiment, a method for performing a user call forwarding operation through near field communication between a fixed terminal and a portable terminal includes determining that a distance between a first fixed terminal and the portable terminal is within a specified distance, detecting a movement within the specified distance, determining that the detected movement is the same as a specified movement, and requesting call forwarding to the first fixed terminal when the detected movement is the same as the specified movement.

34 Claims, 10 Drawing Sheets

CALL FORWARDING APPARATUS AND METHOD

CROSS-REFERENCE TO RELATED APPLICATION(S) AND CLAIM OF PRIORITY

The present application is related to and claims priority under 35 U.S.C. §119 to an application filed in the Korean Intellectual Property Office on Jan. 17, 2012 and assigned Serial No. 10-2012-0005271, the contents of which are incorporated herein by reference.

TECHNICAL FIELD OF THE INVENTION

The present invention generally relates to communication devices, and more particularly, to a call forwarding apparatus and method.

BACKGROUND OF THE INVENTION

With the development of information communication technology, functions of portable terminals have been developed to satisfy various demands of users. For example, a call forwarding function has been developed that forwards a call connected to a fixed terminal to a portable terminal during the call between terminals registered in an enterprise network.

However, in order to forward a call of a fixed terminal to a portable terminal or forward a call of a portable terminal to a fixed terminal by using the call forwarding function, a user often directly presses a call forwarding key provided by the terminal. For example, when desiring to search for data located in an office storehouse while making an urgent official call by a fixed terminal provided in an office, a user should typically presses a call forwarding button of the fixed terminal to forward a call connected to the fixed terminal to a portable terminal.

In addition, when both hands of the user are busy holding a telephone receiver with one hand and taking a memo with the other hand, the user may be inconvenienced in forwarding the call by using the call forwarding function. Therefore, there is an need for a user-based call service that can forward a call without directly pressing a call forwarding button of a fixed terminal.

SUMMARY OF THE INVENTION

To address the above-discussed deficiencies of the prior art, it is a primary object to provide an apparatus and method for providing a user-based call forwarding function.

Other embodiments of the present invention may include providing an apparatus and method for performing a user call forwarding operation through near field communication between a fixed terminal and a portable terminal without directly pressing a call forwarding button of the fixed terminal by a user.

According to an embodiment of the present invention, a method for operating a portable terminal includes determining that a distance between a first fixed terminal and the portable terminal is within a specified distance, detecting a movement within the specified distance, determining that the detected movement is the same as a specified movement, and requesting call forwarding to the first fixed terminal when the detected movement is the same as the specified movement.

According to another embodiment of the present invention, a method for operating a server includes connecting a call between one or more fixed terminals and one or more portable terminals; and receiving a call forwarding request from any one of the fixed terminals or any one of the portable terminals, and forwarding the call.

According to yet another embodiment of the present invention, a method for operating a fixed terminal includes determining that a distance between a portable terminal and the fixed terminal is within a specified distance and receiving a call forwarding request from the portable terminal.

According to yet another embodiment of the present invention, an apparatus of a portable terminal includes a sensor unit configured to detect a movement within a specified distance, a control unit configured to determine that a distance between a first fixed terminal and the portable terminal is within the specified distance, and determine that the detected movement is the same as a specified movement, and a communication module configured to request call forwarding to the first fixed terminal when the detected movement is the same as the specified movement.

According to yet another embodiment of the present invention, an apparatus of a server includes a control unit configured to connect a call between one or more fixed terminals and one or more portable terminals; and a communication unit configured to receive a call forwarding request from any one of the fixed terminals or any one of the portable terminals and forwarding the call.

According to yet another embodiment of the present invention, an apparatus of a fixed terminal includes a control unit configured to determine that a distance between a portable terminal and the fixed terminal is within a specified distance, and a communication unit configured to receive a call forwarding request from the portable terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
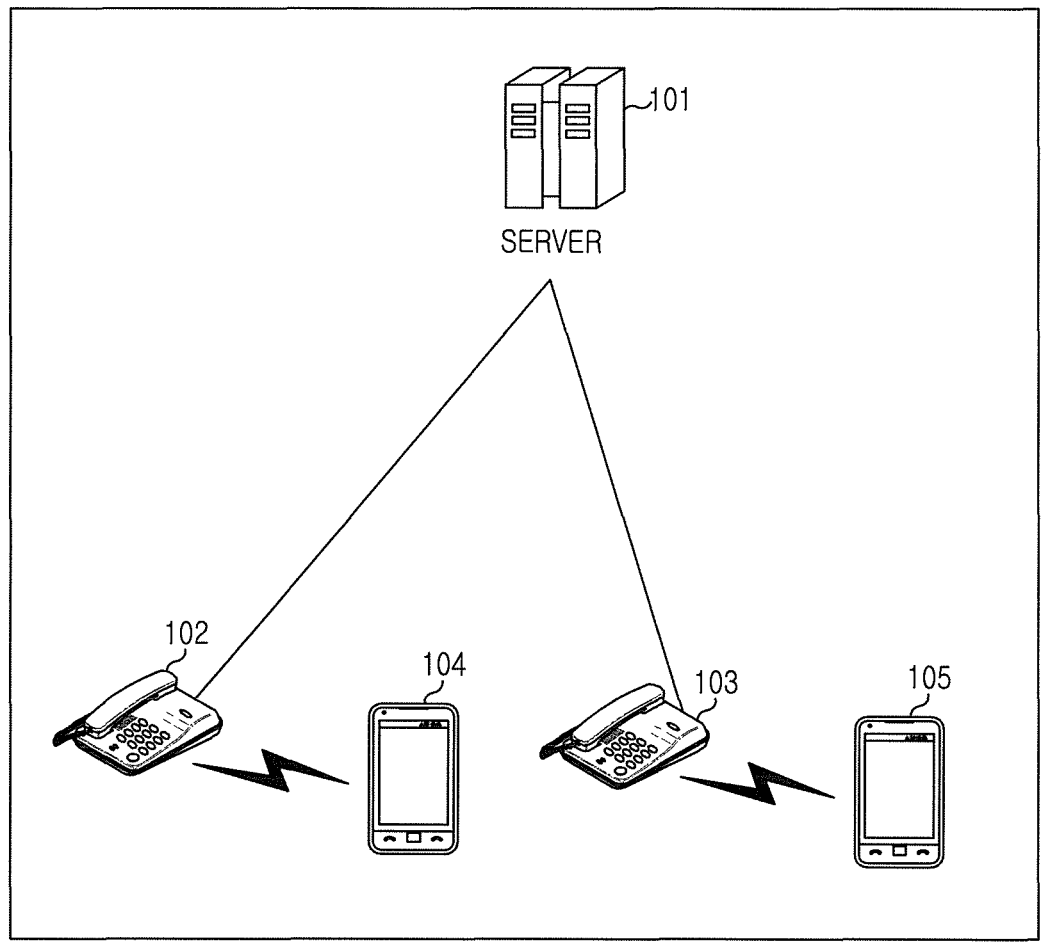
FIG. 1 illustrates an overall configuration of a call forwarding system according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication devices. Exemplary embodiments of the present disclosure will be described herein below with reference to the accompanying drawings so that those skilled in the art can easily embody the present disclosure. In the following description of the exemplary embodiments, detailed descriptions of well-known functions or configurations will be omitted since they would unnecessarily obscure the subject matters of the present disclosure. Also, like reference numerals denote like elements through the specification and drawings.

FIG. 1 illustrates an overall configuration of a call forwarding system according to an embodiment of the present disclosure. As illustrated in FIG. 1, a call forwarding system according to an embodiment of the present disclosure may include a server 101, a first fixed terminal 102, a second fixed terminal 102, a first portable terminal 104, and a second portable terminal 105.

The server 101 manages authentication of users registered in the server 101, and monitors user states. Specifically, embodiments of the present disclosure may be applied in an enterprise network environment. For example, the server 101 may be an enterprise server that controls various services in an enterprise network, and the first fixed terminal 102, the second fixed terminal 102, the first portable terminal 104, and the second portable terminal 105 may be edge VoIP (Voice over Internet Protocol) devices that performs a service request/response in conjunction with the server 101. The first fixed terminal 102 and the second fixed terminal 102 may be desk phones that are generally fixed in position; and the first portable terminal 104 and the second portable terminal 105 may be mobile devices that have mobility. In the present disclosure, one or more fixed terminals and one or more portable terminals should be registered in the server in order to perform a call forwarding function between one another. That is, in order to perform a call function or a call forwarding function between fixed terminals or portable terminals, all of the fixed terminals or the portable terminals should be registered in the server 101. For example, in order for two fixed terminals to perform a call between one another in an office, both the two fixed terminals should be registered in the server in advance. In addition, as will be described below, the portable terminal desiring to use the call forwarding function should also be registered in the server 101 in advance. Thus, the fixed terminal or the portable terminal subscribed in the server 101 periodically transmits a registration message to the server 101. That is, by periodically receiving a registration message from the fixed terminal or the portable terminal that is registered, the server 101 may detect a current state of the terminal.

Although the present disclosure is applied in the enterprise network as described above, a call forwarding service of the present disclosure may also be provided through a server provided by a service provider. That is, since the call forwarding function of the present disclosure is performed not only in an office but also through a server provided by a service provider, any fixed terminal or portable terminal registered in a provider server may be applicable in a wide range of uses. Hereinafter, for ease of understanding the call forwarding function according to the present disclosure, it is assumed that the server 101 is located in an office.

As described above, the first fixed terminal 102 and the second fixed terminal 103 are terminals registered in the server 101. Specifically, the first fixed terminal 102 and the second fixed terminal 103 may connect a call between one another through the server 101. In addition, the first fixed terminal 102 and the second fixed terminal 103 may include a communication module for performing near field communication with the portable terminal. Conventionally, in order to forward a call from a fixed terminal to a portable terminal in the enterprise network environment, a user may need to press a call forwarding button of the fixed terminal to forward a call to the portable terminal. For example, when desiring to search for data located in an office storehouse while making an urgent official call by a fixed terminal provided in an office, a user often directly presses a call forwarding button of the fixed terminal to forward a call to the fixed terminal to a portable terminal. In addition, when both hands of the user are busy holding a telephone receiver with one hand and taking a memo with the other hand, the user is often inconvenienced in forwarding a call by using the conventional call forwarding function. However, embodiments of the present disclosure can perform a call forwarding through a specified operation by performing near field communication between the fixed terminal and the portable terminal, thereby improving the convenience of users.

As described above, the first portable terminal 104 and the second portable terminal 105 are terminals registered in the server 101. Specifically, when the first portable terminal 104 and the second portable terminal 105 connect a call between one another through the server 101, the first portable terminal 104 or the second portable terminal 105 may approach the first fixed terminal 102 or the second fixed terminal 103 to forward a call from the fixed terminal to the portable terminal through a specified operation. For example, it is assumed that a user of the first fixed terminal 102 and a user of the second fixed terminal 103 make a call between one another through the first fixed terminal 102 and the second fixed terminal. In the case where the user of the second fixed terminal 103, which making a call at his/her seat, can continue to make a call while moving to a conference room, when the user of the second fixed terminal 103 approaches the second portable terminal 105 to the second fixed terminal 103 and performs a specified operation, a call to the second fixed terminal 103 is forwarded to the second portable terminal 105. Thus in certain embodiments, the user of the second fixed terminal 103 can rapidly and easily forward the call from the fixed terminal to the portable terminal and continue to make the call while moving.

Although the present embodiment has described an example of forwarding a call from the fixed terminal to the portable terminal, it should be understood that a call may be forwarded from the portable terminal to the fixed terminal while the call is being made between the portable terminals registered in the server 101. That is, regardless of being the fixed terminal or the portable terminal, a call may be forwarded between terminals as long as the terminals are registered in the server 101.

Figure 2:
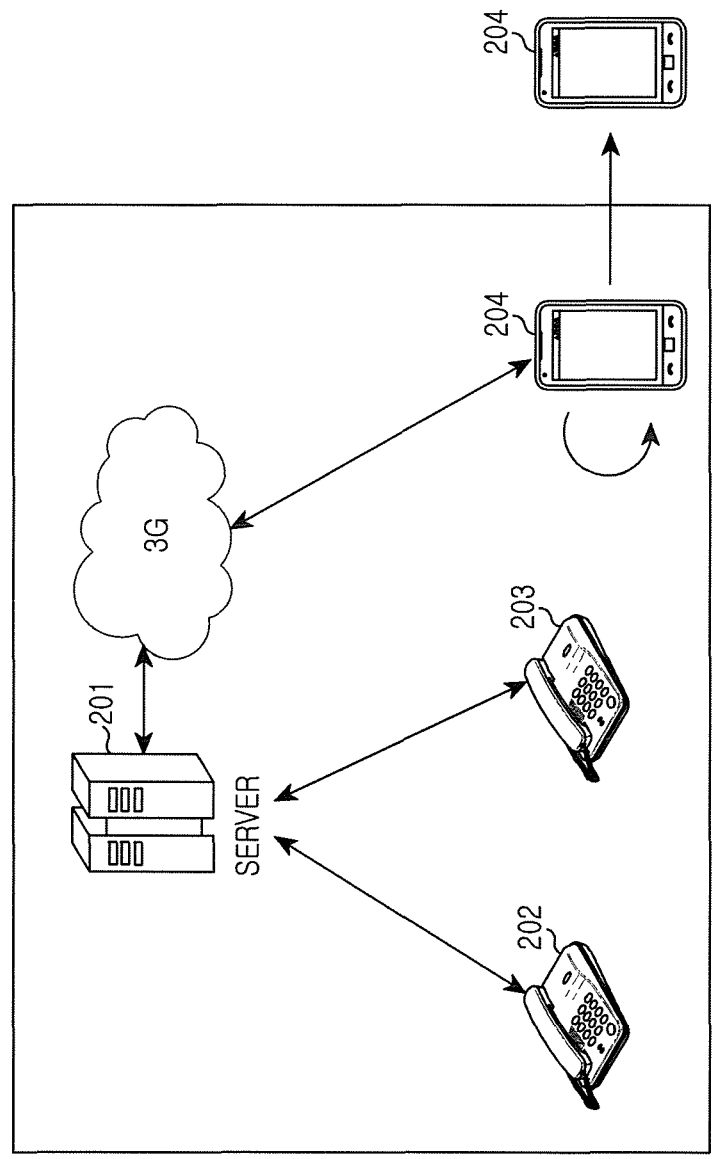
FIG. 2 illustrates an example process of forwarding a call from a fixed terminal to a portable terminal according to an embodiment of the present disclosure.

FIG. 2 illustrates an example process of forwarding a call from a fixed terminal to a portable terminal according to an embodiment of the present disclosure. As described with reference to FIG. 1, a first fixed terminal 202, a second fixed terminal 203, and a first portable terminal 204 are terminals registered in a server 201.

First, it is assumed that a user of the second fixed terminal 203 desires to forward a call from the second fixed terminal 203 to the first portable terminal 204 of the user when a call is connected between the first fixed terminal 202 and the second fixed terminal 203 through the server 201. While making the call by the second fixed terminal 203, the user moves the first portable terminal 204 toward the second fixed terminal 203. The first portable terminal 204 having been moved toward the second fixed terminal 203 determines whether the first portable terminal 204 is within a specified distance from the second fixed terminal 203. Specifically, the second fixed terminal 203 and the first portable terminal 204 are terminals that can perform a contact or contactless communication with one another. For example, the second fixed terminal 203 and the first portable terminal 204 are terminals that support NFC (Near Field Communication) such as MiFare and Felica, and RF (Radio Frequency) communication. Thus, the second fixed terminal 203 and the first portable terminal 204 may perform near field communication to determine whether the distance between each other is within a specified distance defined by the user. Herein, the specified distance is defined as a distance within which the second fixed terminal 203 and the first portable terminal 204 can perform near field communication between one another.

When determining that the first portable terminal 204 is within the specified distance from the second fixed terminal 203, the first portable terminal 204 displays to the user, a message indicating that the first portable terminal 204 is within the specified distance from the second fixed terminal 203. For example, a display unit of the first portable terminal 204 displays information indicating that the second fixed terminal 203 and the first portable terminal 204 are located within the specified distance so that a call can be forwarded from the second fixed terminal 203 to the first portable terminal 204.

When determining from the first portable terminal 204 that call forwarding is possible, the user can forward a call connected to the second fixed terminal 203 to the first portable terminal 204. Specifically, when the user holds the first portable terminal 204 and performs a specified operation, the call can be automatically forwarded from the second fixed terminal 203 to the first portable terminal 204. Herein, the specified operation includes an operation defined by the user. When the user inputs and stores the specified operation in the portable terminal, the portable terminal determines whether the specified operation is performed after transmission of the message indicating that the call forwarding function is possible. For example, the specified operation, which is set for the first portable terminal 204 to receive forwarding of a call connected to the second fixed terminal 203, may be set to 'moving the first portable terminal 204 vertically while holding the first portable terminal 204 horizontally'. Thus, in the present embodiment, when the user moves the first portable terminal 204 vertically while holding the first portable terminal 204 horizontally, a process for forwarding a call from the second fixed terminal 203 to the first portable terminal 204 is started. As another example, the specified operation may be set to 'turning the first portable terminal 204 in the clockwise direction while holding the first portable terminal 204'. Thus, in the present embodiment, when the user turns the first portable terminal 204 in the clockwise direction while holding the first portable terminal 204, a process for forwarding a call from the second fixed terminal 203 to the first portable terminal 204 is started.

The portable terminal may detect the specified operation by using a sensor provided in the portable terminal. Specifically, the portable terminal may use a sensor provided in the portable terminal detects a change in spatial location and/or speed by the user in real time. The sensor may include at least one of an acceleration sensor and a gyro sensor. That is, the portable terminal may detect the changing spatial location and speed of the portable terminal by using the acceleration sensor and the gyro sensor, and determine whether a user operation is the specified operation based on the detected change in spatial location and/or speed.

When detecting the specified operation of the user, the first portable terminal 204 requests a call forwarding to the second fixed terminal 203 through near field communication. When receiving the call forwarding request from the first portable terminal 204, the second fixed terminal 203 requests that the server 201 forward a call connected to the second fixed terminal 203 to the first portable terminal 204. When receiving a call forwarding request from the second fixed terminal 203, the server 201 requests a call through a 3G (Third Generation) voice network by a number allocated to the first portable terminal 204. For example, when an extension number of the second fixed terminal 203 is '1234' and an extension number of the first portable terminal 204 is '5678', the server 201 requests a call by the number '5678'. When the first portable terminal 204 receives the call request from the server 201 and receives an input of a call button from the user, the server 201 ends a call connected to the second fixed terminal 203 and forwards the call connected to the second fixed terminal 203 to the first portable terminal 204.

Although FIG. 2 illustrates that the server 201 requests a call to the first portable terminal 204 through the 3G voice network, the server 201 may also request a call to the first portable terminal 204 through a WiFi network. Specifically, when receiving the call forwarding request from the second fixed terminal 203, the server 201 may request a call through the WiFi network by the number allocated to the second fixed terminal 203.

When receiving the forwarded call from the second fixed terminal 203, the user may continue to make the call with a user of the first fixed terminal 202 by the first portable terminal 204. As described above, since the portable terminal 204 is connected through the 3G voice network to the first fixed terminal 202, the call continues to be connected even when the user is out of the office. For example, the user making a call in the office by the second fixed terminal 203 can forward a call to the first portable terminal 204 and continue to make a call even outside the office.

Figure 3:
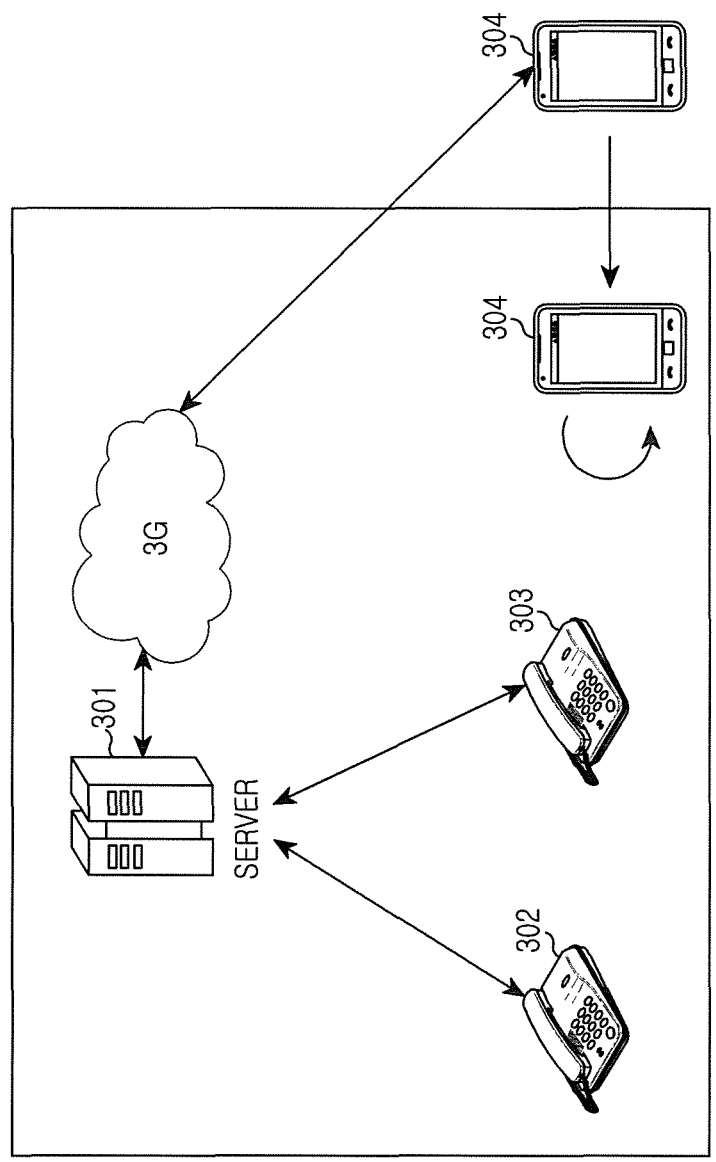
FIG. 3 illustrates an example process of forwarding a call from a portable terminal to a fixed terminal according to an embodiment of the present disclosure.

FIG. 3 illustrates an example process of forwarding a call from a portable terminal to a fixed terminal according to an embodiment of the present disclosure. As described with reference to FIG. 1, a first fixed terminal 302, a second fixed terminal 303, and a first portable terminal 304 are terminals registered in a server 301.

First, it is assumed that a user of the first portable terminal 304 desires to forward a call from the first portable terminal 304 to the second fixed terminal 303 of the user when a call is connected between the first fixed terminal 304 and the first portable terminal 304 through the server 301. While making a call by the first portable terminal 304, the user moves the first portable terminal 304 toward the second fixed terminal 303. The first portable terminal 304 having been moved toward the second fixed terminal 303 determines whether the first portable terminal 304 is within a specified distance from the second fixed terminal 303. Specifically, the second fixed terminal 303 and the first portable terminal 304 are terminals that can perform a contact or contactless communication with one another. For example, the second fixed terminal 303 and the first portable terminal 304 are terminals that support NFC such as MiFare and Felica, and RF communication. Thus, the second fixed terminal 303 and the first portable terminal 304 may perform near field communication to determine whether the distance between each other is within a specified distance. Herein, the specified distance is defined as a distance within which the second fixed terminal 303 and the first portable terminal 304 can perform near field communication between one another.

When determining that the first portable terminal 304 is within the specified distance from the second fixed terminal 303, the first portable terminal 304 displays to the user, a message indicating that the first portable terminal 304 is within the specified distance from the second fixed terminal 303. For example, a display unit of the first portable terminal 304 displays information indicating that the second fixed terminal 303 and the first portable terminal 304 are located within the specified distance so that a call can be forwarded from the first portable terminal 304 to the second fixed terminal 303.

When determining from the first portable terminal 304 that call forwarding is possible, the user can forward a call connected to the first portable terminal 304 to the second fixed terminal 303. Specifically, when the user holds the first portable terminal 304 and performs a specified operation, the call can be automatically forwarded from the first portable terminal 304 to the second fixed terminal 303. Herein, the specified operation is an operation defined by the user. When the user inputs and stores the specified operation in the portable terminal, the portable terminal determines whether the specified operation is performed after transmission of the message indicating that the call forwarding function is possible. For example, the specified operation, which is set for the second fixed terminal 303 to receive a forwarding of a call connected to the first portable terminal 304, may be set to 'moving the first portable terminal 304 horizontally while holding the first portable terminal 304 vertically'. Thus, in the present embodiment, when the user moves the first portable terminal 304 horizontally while holding the first portable terminal 304 vertically, a process for forwarding a call from the first portable terminal 304 to the second fixed terminal 303 is started. As another example, the specified operation may be set to 'turning the first portable terminal 304 in the counterclockwise direction while holding the first portable terminal 304'.

Thus, in the present embodiment, when the user turns the first portable terminal 304 in the counterclockwise direction while holding the first portable terminal 304, a process for forwarding a call from the first portable terminal 304 to the second fixed terminal 303 is started.

The portable terminal may detect the specified operation by using a sensor provided in the portable terminal. Specifically, the portable terminal may use a sensor provided in the portable terminal to detect a change in spatial location and/or speed by the user in real time. The sensor may include at least one of an acceleration sensor and a gyro sensor. That is, the portable terminal may detect the changing spatial location and/or speed of the portable terminal by using the acceleration sensor and the gyro sensor, and determine whether a user operation is the specified operation based on the detected change in spatial location and/or speed.

When detecting the specified operation of the user, the first portable terminal 304 requests call forwarding to the second fixed terminal 303 through near field communication. When receiving the call forwarding request from the first portable terminal 304, the second fixed terminal 303 requests that the server 301 forward a call connected to the first portable terminal 304 to the second fixed terminal 303. When receiving the call forwarding request from the second fixed terminal 303, the server 301 requests a call through a 3G voice network by a number allocated to the first portable terminal 304. For example, when an extension number of the second fixed terminal 303 is '1234' and an extension number of the first portable terminal 304 is '5678', the server 301 requests a call by the number '5678'. When the first portable terminal 304 receives the call request from the server 301 and receives an input of a call button from the user, the server 301 ends a call connected to the first portable terminal 304 and forwards the call connected to the first portable terminal 304 to the second fixed terminal 303.

When receiving the forwarded call from the first portable terminal 304, the user may continue to make a call with a user of the first fixed terminal 302 by the second fixed terminal 303. For example, in the case where the user of the first portable terminal 304 enters the office while making a call with a user of the first fixed terminal 302 who is outside the office, when the call fee of the fixed terminal is higher than the call fee of the portable terminal, the user may forward a call from the first portable terminal 304 to the second fixed terminal 303 and continue to make a call with the user of the first fixed terminal 302.

Figure 4:
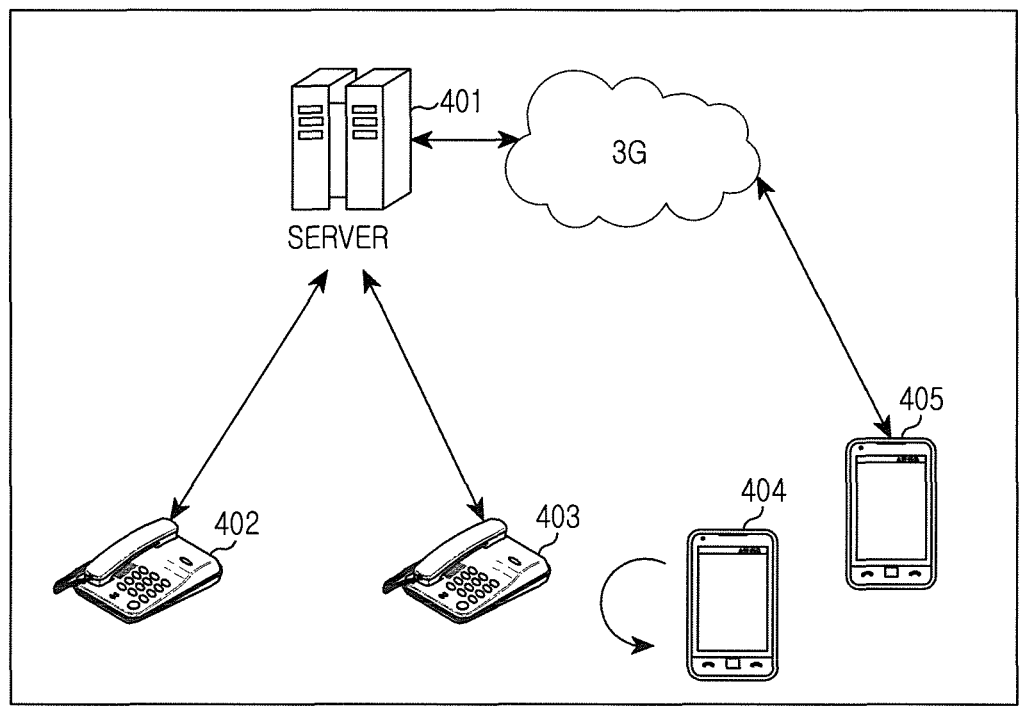
FIG. 4 illustrates an example process of forwarding a call from a user portable terminal to a third party portable terminal according to an embodiment of the present disclosure.

FIG. 4 illustrates an example process of forwarding a call from a user portable terminal to a third party portable terminal according to an embodiment of the present disclosure. As described with reference to FIG. 1, a first fixed terminal 402, a second fixed terminal 403, a user portable terminal 404, and a third party portable terminal 405 are registered in a server 401.

First, it is assumed that a user of the second fixed terminal 403 desires to forward a call from the second fixed terminal 403 to the third party portable terminal 405 when a call is connected between the first fixed terminal 402 and the second fixed terminal 403 through the server 401. While making the call by the second fixed terminal 403, the user selects the number of the third party portable terminal 405 stored in the user portable terminal 404 and moves the user portable terminal 404 toward the second fixed terminal 403. For example, while making a call with a user of the first fixed terminal 402 in the office, the user of the second fixed terminal 403 may forward a call connected to the second fixed terminal 403 to the third party portable terminal 405.

The user portable terminal 404 having been moved toward the second fixed terminal 403 determines whether the user portable terminal 404 is within a specified distance from the second fixed terminal 403. Specifically, the second fixed terminal 403 and the user portable terminal 404 are terminals that can perform a contact or contactless communication with one another. For example, the second fixed terminal 403 and the user portable terminal 404 may support NFC such as MiFare and Felica, and RF communication. Thus, the second fixed terminal 403 and the user portable terminal 404 may perform near field communication to determine whether the distance between one another is within a specified distance defined by the user. Herein, the specified distance is defined as a distance within which the second fixed terminal 403 and the user portable terminal 404 can perform near field communication therebetween.

When determining that the user portable terminal 404 is within the specified distance from the second fixed terminal 403, the user portable terminal 404 displays to the user, a message indicating that the user portable terminal 404 is within the specified distance from the second fixed terminal 403. For example, a display unit of the user portable terminal 404 displays information indicating that the second fixed terminal 403 and the user portable terminal 404 are located within the specified distance so that a call can be forwarded from the second fixed terminal 403 to the third party portable terminal 405.

When determining from the user portable terminal 404 that a call forwarding is possible, the user can forward a call connected to the second fixed terminal 403 to the third party portable terminal 405. Specifically, when the user holds the user portable terminal 404 and performs a specified operation, the call can be automatically forwarded from the second fixed terminal 403 to the third party portable terminal 405. Herein, the specified operation is an operation defined by the user. When the user inputs and stores the specified operation in the portable terminal, the portable terminal determines whether the specified operation is performed after transmission of the message indicating that the call forwarding function is possible. For example, the specified operation, which is set for the third party portable terminal 405 to receive a forwarding of a call connected to the second fixed terminal 403, may be set to 'moving the user portable terminal 404 vertically while holding the user portable terminal 404 horizontally'. Thus, in the present embodiment, when the user moves the user portable terminal 404 vertically while holding the user portable terminal 404 horizontally, a process for forwarding a call from the second fixed terminal 403 to the third party portable terminal 405 is started.

The portable terminal may detect the specified operation by using a sensor provided in the portable terminal. Specifically, the portable terminal may use a sensor provided in the portable terminal to detect a change in spatial location and/or a speed by the user in real time. The sensor may include at least one of an acceleration sensor and a gyro sensor. That is, the portable terminal may detect the changing spatial location and/or speed of the portable terminal by using the acceleration sensor and the gyro sensor, and determine whether a user operation is the specified operation based on the detected spatial location and speed.

When detecting the specified operation of the user, the user portable terminal 404 requests call forwarding to the second fixed terminal 403 through near field communication. When receiving the call forwarding request from the user portable terminal 404, the second fixed terminal 403 requests that the server 401 forward a call connected to the second fixed terminal 403 to the third party portable terminal 405. When receiving the call forwarding request from the second fixed terminal 403, the server 401 requests a call through a 3G voice network by a number allocated to the third party portable terminal 405. For example, when an extension number of the second fixed terminal 403 is '1234' and an extension number of the third party portable terminal 405 is '5678', the server 401 holds the call connected to the first fixed terminal 402 and requests a call by the number '5678'. When the third party portable terminal 405 receives the call request from the server 401 and receives an input of a call button from the user, the server 401 ends the call connected to the second fixed terminal 403 and forwards the call connected to the second fixed terminal 403 to the third party portable terminal 405.

Although FIG. 4 illustrates that the server 401 requests a call to the third party portable terminal 405 through the 3G voice network, the server 401 may also request a call to the third party portable terminal 405 through another type of communication network, such as a WiFi network. Specifically, when receiving the call forwarding request from the second fixed terminal 403, the server 401 may request a call through the WiFi network by the number allocated to the second fixed terminal 403. The difference between the 3G voice network and the WiFi network is whether a call can be continued outside the office. That is, when the third party portable terminal 405 is connected through the 3G voice network, the third party portable terminal 405 can continue to connect the call even outside the office, but when the third party portable terminal 405 is connected through the WiFi network, the third party portable terminal 405 may not be able to continue to connect the call outside the office.

Figure 5:
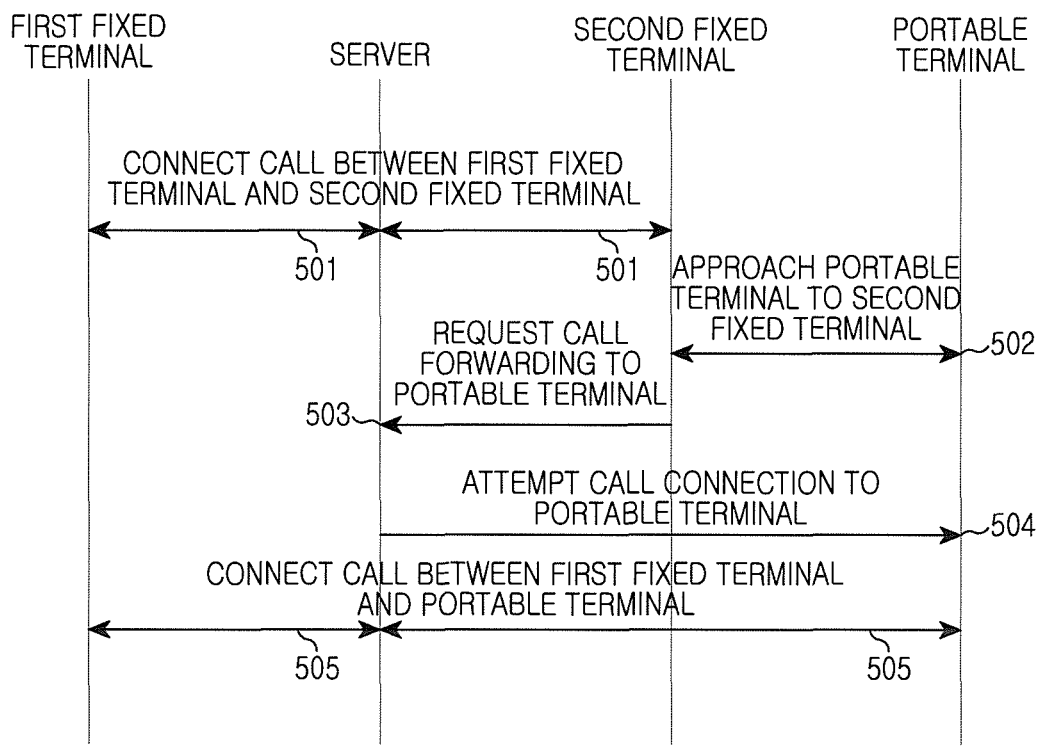
FIG. 5 illustrating an example process of forwarding a call from a fixed terminal to a portable terminal according to an embodiment of the present disclosure.

FIG. 5 illustrates an example process of forwarding a call from a fixed terminal to a portable terminal according to an embodiment of the present disclosure. As illustrated in FIG. 5, first, it is assumed that a first fixed terminal and a second fixed terminal are connected to each other through a server (501). Specifically, the first fixed terminal and the second fixed terminal are located inside an office, and are connected to each other. Hereinafter, it is assumed that a user of the second fixed terminal attempts to forward a call from the second fixed terminal to a portable terminal of the user.

While the first fixed terminal and the second fixed terminal are connected to each other, the portable terminal is moved toward the second fixed terminal (502). Specifically, the user making a call by the second fixed terminal may approach the portable terminal to the second fixed terminal to make a request for a call forwarding from the second fixed terminal to the portable terminal. In order to request call forwarding to the second fixed terminal, the second fixed terminal and the portable terminal should be located within a specified distance. Herein, the specified distance is defined as a distance within which the second fixed terminal and the portable terminal can perform near field communication therebetween. When determining that the portable terminal is located within the specified distance from the second fixed terminal, the portable terminal displays to the user, a message indicating that the portable terminal is located within the specified distance. Thereafter, the portable terminal detects a movement of the terminal by the user. When determining that the detected movement is a specified operation, the portable terminal requests call forwarding to the second fixed terminal. Herein, the specified operation is an operation defined by the user. In the present embodiment, the specified operation is a signal indicating that the portable terminal is to receive forwarding of a call connected to the second fixed terminal. In the present disclosure, since the second fixed terminal and the portable terminal can perform near field communication between one another, when the movement of the portable terminal is the specified operation, a call forwarding request signal may be automatically transmitted to the second fixed terminal.

When receiving the call forwarding request from the portable terminal, the second fixed terminal transmits a call forwarding request to the server (503). Specifically, since the second fixed terminal and the portable terminal can perform near field communication, when the portable terminal having detected the specified operation transmits a call forwarding request to the second fixed terminal, the second fixed terminal requests the server to forward a call connected to the second fixed terminal to the portable terminal.

When receiving the call forwarding request from the second fixed terminal, the server attempts a call connection to the portable terminal (504). Specifically, when receiving the call forwarding request from the second fixed terminal, the server transmits a call request through the 3G voice network by a number allocated to the portable terminal. For example, when an extension number of the second fixed terminal is '1234' and an extension number of the portable terminal is '5678', the server requests a call by the number '5678'. In addition, instead of attempting a call to the portable terminal through the 3G voice network, the server may request a call to the portable terminal through another communication network, such as a WiFi network. For example, when receiving the call forwarding request from the second fixed terminal, the server may request a call through the WiFi network by the number allocated to the second fixed terminal.

When receiving the call connection request from the server, the portable terminal receives a forwarding of a call connected to the second fixed terminal and connects a call with the first fixed terminal (505). Specifically, when the portable terminal receives a call request from the server and receives an input of a call button from the user, the server ends the call connected to the second fixed terminal and forwards the call connected to the second fixed terminal to the portable terminal. When receiving the call forwarding from the second fixed terminal, the user may continue to make the call with a user of the first fixed terminal by the portable terminal. If the portable terminal is connected through the 3G voice network to the first fixed terminal, the call can continue to be connected outside the office. For example, the user making a call in the office by the second fixed terminal can forward the call to the portable terminal and continue the call even outside the office.

Figure 6:
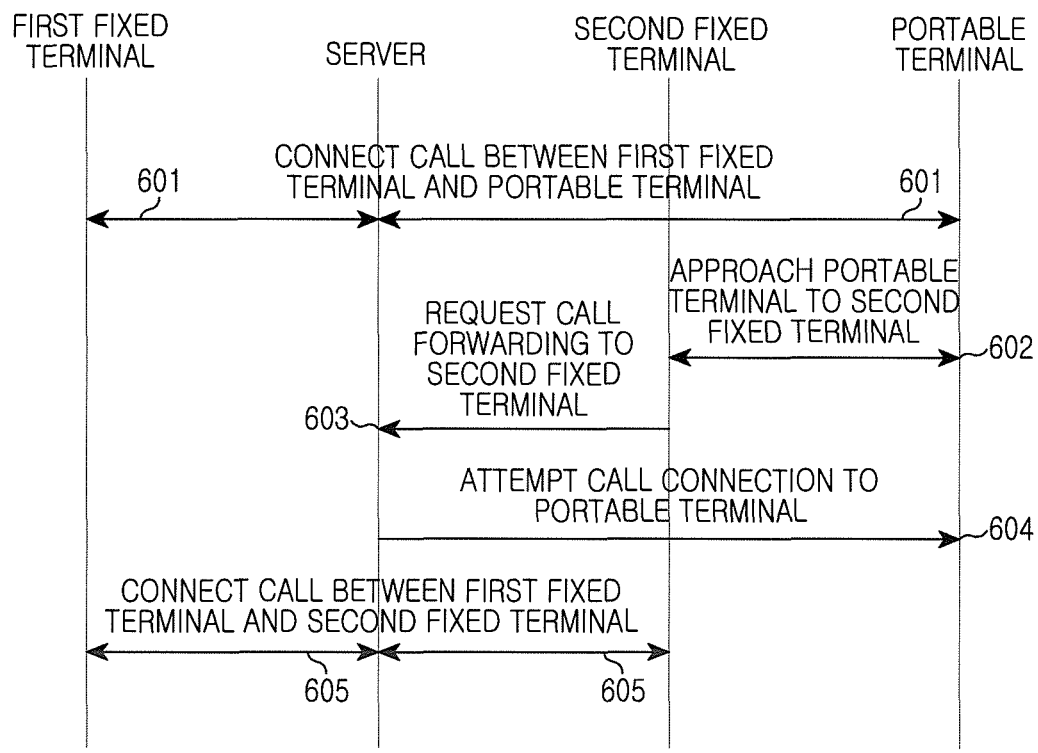
FIG. 6 illustrates an example process of forwarding a call from a portable terminal to a fixed terminal according to an embodiment of the present disclosure.

FIG. 6 illustrates an example process of forwarding a call from a portable terminal to a fixed terminal according to an embodiment of the present disclosure. As illustrated in FIG. 6, first, it is assumed that a first fixed terminal and a portable terminal are connected to each other through a server (601). Specifically, the first fixed terminal is a fixed terminal located inside an office, the portable terminal is a mobile portable terminal, and the first fixed terminal and the portable terminal are connected to each other. Hereinafter, it is assumed that a user of the second fixed terminal attempts to forward a call from the portable terminal of the user to the second fixed terminal.

While the second fixed terminal and the portable terminal are connected to each other, the portable terminal approaches the second fixed terminal (602). Specifically, the user making a call by the portable terminal may approach the portable terminal to the second fixed terminal to make a request for a call forwarding from the portable terminal to the second fixed terminal. In order to request call forwarding to the second fixed terminal, the second fixed terminal and the portable terminal should be located within a specified distance. When determining that the portable terminal is located within the specified distance from the second fixed terminal, the portable terminal displays to the user, a message indicating that the portable terminal is located within the specified distance. Thereafter, the portable terminal detects a movement by the user. When determining that the detected movement is a specified operation, the portable terminal requests a call forwarding to the second fixed terminal. Herein, the specified operation is an operation defined by the user. In the present embodiment, the specified operation is a signal indicating that a call connected to the portable terminal is to be forwarded to the second fixed terminal. In the present disclosure, since the second fixed terminal and the portable terminal can perform near field communication between one another, when the movement of the portable terminal is the specified operation, a call forwarding request signal may be automatically transmitted to the second fixed terminal.

When receiving the call forwarding request from the portable terminal, the second fixed terminal transmits a call forwarding request to the server (603). Specifically, since the second fixed terminal and the portable terminal can perform near field communication, when the portable terminal having detected the specified operation transmits a call forwarding request to the second fixed terminal, the second fixed terminal requests the server to forward a call connected to the portable terminal to the second fixed terminal.

When receiving the call forwarding request from the second fixed terminal, the server attempts a call connection to the portable terminal (604). Specifically, when receiving the call forwarding request from the second fixed terminal, the server transmits a call request through the 3G voice network by a number allocated to the portable terminal. For example, when an extension number of the second fixed terminal is '1234' and an extension number of the portable terminal is '5678', the server requests a call by the number '5678'.

When the portable terminal responds to the call request of the server, the server disconnects the call connection with the portable terminal, and the first fixed terminal and the portable terminal are call-connected to each other (605). Specifically, when the portable terminal receives the call request from the server and receives an input of a call button from the user, the server ends the call connected to the portable terminal and forwards the call connected to the portable terminal to the second fixed terminal. When receiving the call forwarding from the portable terminal, the user may continue to make a call with a user of the first fixed terminal by the second fixed terminal. For example, in the case where the user of the portable terminal enters the office while making a call with the user of the first fixed terminal outside the office, when the call fee of the portable terminal is higher than the call fee of the second fixed terminal, the user may forward a call from the portable terminal to the second fixed terminal and continue to make a call with the user of the first fixed terminal.

Figure 7:
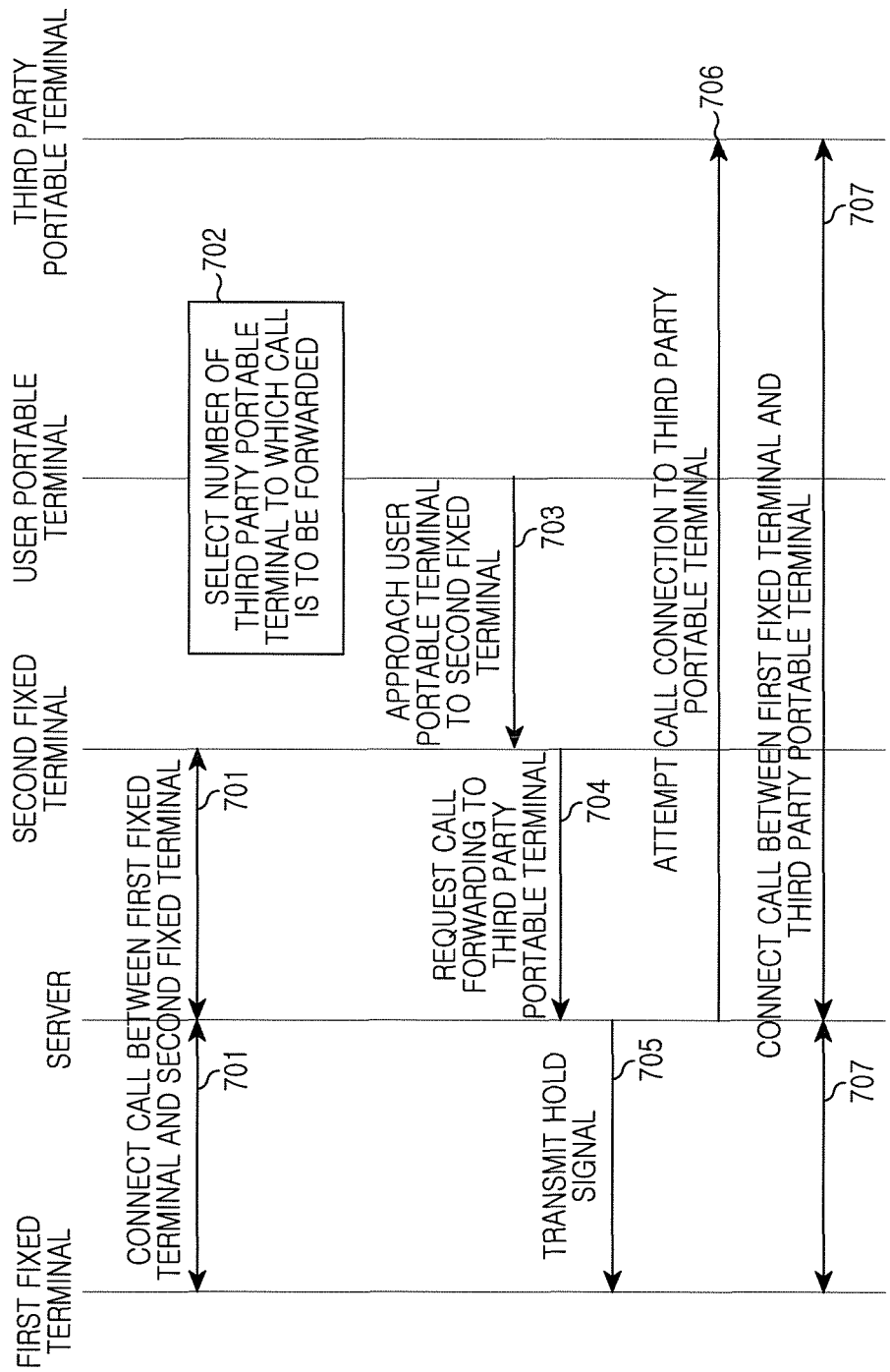
FIG. 7 illustrates an example process of forwarding a call from a fixed terminal to a third party portable terminal according to an embodiment of the present disclosure.

FIG. 7 illustrates an example process of forwarding a call from a fixed terminal to a third party portable terminal according to an embodiment of the present disclosure. As illustrated in FIG. 7, first, it is assumed that a first fixed terminal and a second fixed terminal are connected to each other through a server (701). Specifically, the first fixed terminal and the second fixed terminal are located inside an office, and are connected to each other. Hereinafter, it is assumed that a user of the second fixed terminal attempts to forward a call from the second fixed terminal to a third party portable terminal.

Thereafter, a user portable terminal selects the number of the third party portable terminal to which a call is to be forwarded (702). Specifically, while making a call with a user of the first fixed terminal by the second fixed terminal, the user may attempt to connect a call connected to the second fixed terminal to the third party portable terminal. That is, the user searches a phone book stored in the portable terminal, and selects a specific person that includes the number of the third party portable terminal to which a call is to be forwarded. Although FIG. 7 illustrates the third party portable terminal as an example, the terminal is not limited to a portable terminal and may include a fixed terminal as long as the fixed terminal is registered in the server.

After selecting the number of the third party portable terminal to which a call is to be forwarded in the user portable terminal, the user moves the portable terminal including the number of the third party portable terminal to the second fixed terminal (703). That is, in the present disclosure, when the number of the third party portable terminal is stored in the user portable terminal in order to forward a call to the third party portable terminal, the number of the third party portable terminal may be specified to request a call forwarding through near field communication with the second fixed terminal. In order to request call forwarding to the second fixed terminal, the second fixed terminal and the portable terminal should be located within a specified distance. When determining that the portable terminal is located within the specified distance from the second fixed terminal, the portable terminal displays to the user, a message indicating that the portable terminal is located within the specified distance. Thereafter, the portable terminal detects a movement by the user. When determining that the detected movement is a specified operation, the portable terminal requests call forwarding to the second fixed terminal. Herein, the specified operation is defined by the user. In the present embodiment, the specified operation is a signal indicating that a call connected to the second fixed terminal is to be forwarded to the third party portable terminal. In the present disclosure, since the second fixed terminal and the portable terminal can perform near field communication between one another, when the changed movement of the portable terminal is the specified operation, a call forwarding request signal may be automatically transmitted to the second fixed terminal.

When receiving the call forwarding request from the user portable terminal, the second fixed terminal transmits a call forwarding request to the server (703). Specifically, since the second fixed terminal and the user portable terminal can perform near field communication, when the portable terminal having detected the specified operation transmits a call forwarding request to the second fixed terminal, the second fixed terminal requests the server to forward a call connected to the second fixed terminal to the third party portable terminal.

When receiving the call forwarding request from the second fixed terminal, the server attempts a call connection to the third party portable terminal (704). Specifically, when receiving the call forwarding request from the second fixed terminal, the server transmits a call request through the 3G voice network by a number allocated to the third party portable terminal. For example, when an extension number of the second fixed terminal is '1234' and an extension number of the third party portable terminal is '5678', the server requests a call by the number '5678'. In addition, instead of attempting a call to the portable terminal through the 3G voice network, the server may request a call to the portable terminal through another communication network, such as a WiFi network.

When receiving the call forwarding request from the second fixed terminal, the server transmits a hold signal the first fixed terminal (705). Specifically, when receiving the call forwarding request form the second fixed terminal, the server may hold the call connected to the first fixed terminal before attempting a call connection by the number allocated to the third party portable terminal. However, the user may set the call connection to the second fixed terminal to be continued without transmission of the hold signal to the first fixed terminal by the server. That is, the call connection between the first fixed terminal and the second fixed terminal can be continued until the call is forwarded from the second fixed terminal to the third party portable terminal.

After holding the call of the first fixed terminal, the server attempts a call connection to the third party portable terminal (706). Specifically, when receiving the call forwarding request from the second fixed terminal, the server transmits a call request through the 3G voice network by the number allocated to the third party portable terminal. For example, when an extension number of the second fixed terminal is '1234' and an extension number of the third party portable terminal is '5678', the server requests a call by the number '5678'.

When receiving the call connection request from the server and receiving a forwarding of the call connected to the second fixed terminal, the third party portable terminal is call-connected to the first fixed terminal (707). Specifically, when the third party portable terminal receives a call request from the server and receives an input of a call button from the user, the server ends the call connected to the second fixed terminal and forwards the call connected to the second fixed terminal to the third party portable terminal. When receiving the call forwarding from the second fixed terminal, the third party may continue to make a call with the user of the first fixed terminal by the third party portable terminal. If the third party portable terminal is connected through the 3G voice network to the first fixed terminal, the call can continue to be connected even outside the office.

Figure 8A:
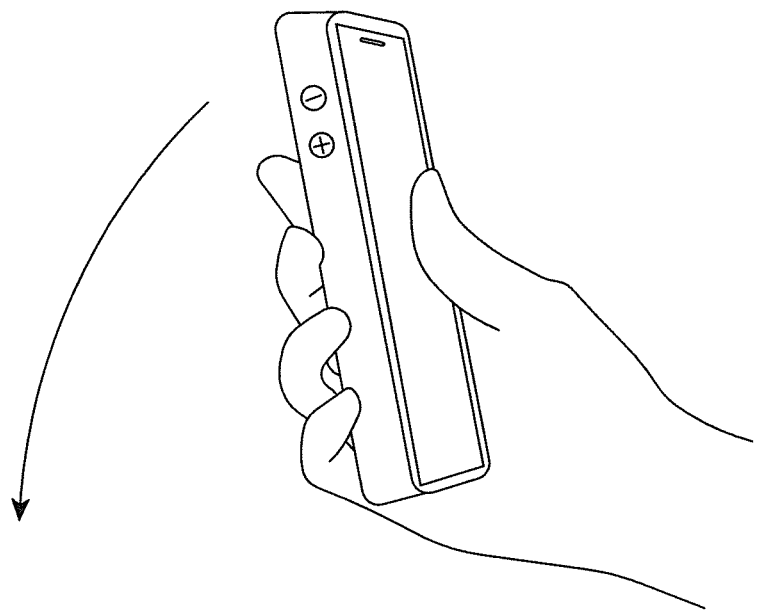
FIGS. 8A and 8B illustrate example operations of requesting a call forwarding according to an embodiment of the present disclosure.
Figure 8B:
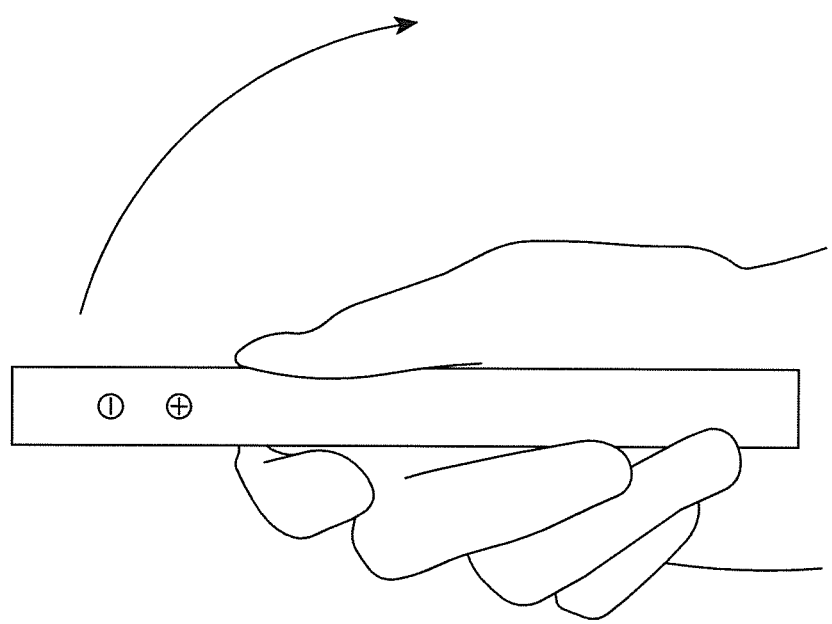

FIGS. 8A and 8B illustrate an example operation of requesting call forwarding according to an embodiment of the present disclosure. In the present disclosure, a portable terminal or a fixed terminal registered in a server can perform near field communication between one another. Thus, when a user defines a specified operation, if the user performs the specified operation while holding the portable terminal, the portable terminal detects the movement and requests a call forwarding to the fixed terminal.

FIG. 8A illustrates an example process of forwarding a call connected to the portable terminal to the fixed terminal. As illustrated in FIG. 8A, when desiring to forward a call connected to the portable terminal to the fixed terminal, the user may input and store the operation illustrated in FIG. 8A in the portable terminal. Specifically, the specified operation may be set to 'moving the portable terminal horizontally while holding the portable terminal vertically'. Thereafter, when the user performs the above operation in order to forward a call from the portable terminal to the fixed terminal, the portable terminal may detect the operation of the user to determine that the detected movement is the specified operation for forwarding a call from the portable terminal to the fixed terminal. Thus, when detecting the above operation, the portable terminal requests the call forwarding to the fixed terminal.

FIG. 8B illustrates an example process of forwarding a call connected to the fixed terminal to the portable terminal. As illustrated in FIG. 8B, when desiring to forward a call connected to the fixed terminal to the portable terminal, the user may input and store the operation illustrated in FIG. 8B in the portable terminal. Specifically, the specified operation may be set to 'moving the portable terminal vertically while holding the portable terminal horizontally'. Thereafter, when the user performs the above operation in order to forward a call from the fixed terminal to the portable terminal, the portable terminal may detect the operation of the user to determine that the detected movement is the specified operation for forwarding a call from the fixed terminal to the portable terminal. Thus, when detecting the above operation, the portable terminal requests a call forwarding to the fixed terminal.

The embodiments of the call forwarding described with reference to FIGS. 8A and 8B are merely an example, and the user may store and use various operations in the portable terminal. For example, the specified operation may be set to 'turning the user portable terminal in the clockwise or counterclockwise direction while holding the portable terminal'.

Figure 9:
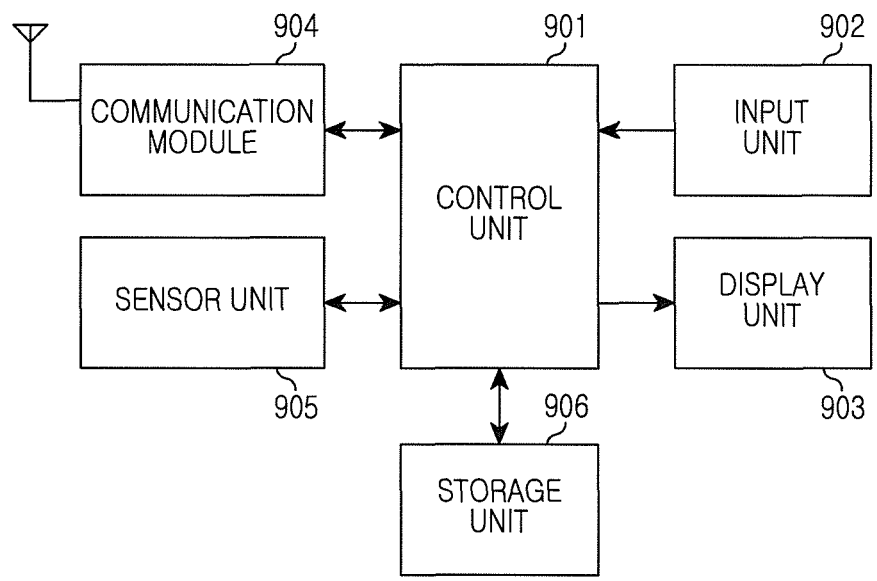
FIG. 9 illustrates an example configuration of a portable terminal according to an embodiment of the present disclosure.

FIG. 9 illustrates a example configuration of a portable terminal according to an embodiment of the present disclosure. As illustrated in FIG. 9, a portable terminal according to an embodiment of the present disclosure may include a control unit 901, an input unit 902, a display unit 903, a communication module 904, and a storage unit 906.

The control unit 901 controls an overall operation of the portable terminal. For example, the control unit 901 determines that a distance from a first fixed terminal is within a specified distance, and determines that a detected movement is the same as a specified movement. In addition, the control unit 901 determines whether the distance from the first fixed terminal is within the specified distance, determines whether the detected movement is the same as the specified movement, and searches for the number of a third fixed terminal to which a call connected to the first fixed terminal engaged with a second fixed terminal is to be forwarded.

The input unit 902 provides the control unit 901 with input data generated by user selection. For example, the input unit 902 receives an input of a command to receive a call forwarding, and receives an input of a command to forward a call to the first fixed terminal. In addition, the input unit 902 receives an input of a command to accept a call request, and receives a selection of the third fixed terminal searched.

The display unit 903 displays information, such as a menu screen and state information of the portable terminal under the control of the control unit 901. For example, the display unit 903 displays a message about whether to forward a call connected to the first fixed terminal engaged with the second fixed terminal, and displays a message about whether to forward a call connected to the portable terminal engaged with the second fixed terminal.

The communication module 904 processes signals transmitted/received through an antenna for voice and data communication. For example, the communication module 904 requests call forwarding to the first fixed terminal. Specifically, the communication module 904 requests a call forward by performing near field communication with the first fixed terminal. Also, the communication module 904 receives a call request from the server, receives a forwarding of a call connected to the first fixed terminal, and attempts a call with the second fixed terminal. In addition, the communication module 904 receives a call request through the 3G voice network by the number allocated to the portable terminal, and receives a call request through other networks, such as a WiFi network by the number allocated to the first fixed terminal.

The sensor unit 905 detects a movement within the specified distance, and detects a change in spatial location and/or a speed in real time by using a sensor provided in the portable terminal.

The storage unit 906 may include a program storage unit for storing a program for controlling an operation of the portable terminal, and a data storage unit for storing data generated during the execution of the program.

In the above block configuration, the control unit 901 may perform an overall function of the portable terminal. The above configurations should be considered in descriptive sense only and not for the purpose of limitation, and those skilled in the art will understand that various changes may be made therein without departing from the scope of the present disclosure. For example, although the respective units are configured and illustrated separately, the control unit 901 may be configured to perform all or some of the functions of the portable terminal.

Figure 10:
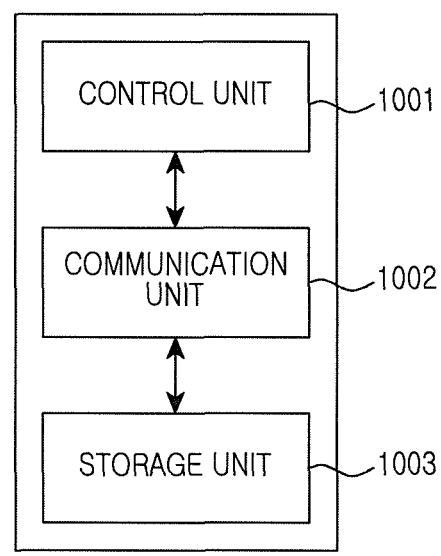
FIG. 10 illustrates an example configuration of a server according to an embodiment of the present disclosure.

FIG. 10 illustrates an example configuration of a server according to an embodiment of the present disclosure. As illustrated in FIG. 10, a server according to an embodiment of the present disclosure may include a control unit 1001, a communication module 1002, and a storage unit 1003.

The control unit 1001 controls an overall operation of the server. For example, the control unit 1001 connects calls between two fixed terminals or one fixed terminal and one portable terminal. Also, the control unit 1001 connects calls with the portable terminal, holds a call connected to the first fixed terminal engaged with the second fixed terminal, and connects calls between the second fixed terminal and the portable terminal. Also, the control unit 1001 connects calls with the first fixed terminal, holds calls connected to the portable terminal engaged with the second fixed terminal, and connects calls between the second fixed terminal and the first fixed terminal. In addition, the control unit 1001 connects calls with the third fixed terminal, holds calls connected to the first fixed terminal engaged with the second fixed terminal, and connects calls between the second fixed terminal and the first fixed terminal.

The communication unit 1002 processes signals transmitted/received through an antenna for voice and data communication. For example, the communication unit 1002 receives forwarding of calls from any one of the terminals or any one of the portable terminals, and forwards the calls. Also, the communication unit 1002 receives requests for forwarding calls connected to the first fixed terminal to the portable terminal form the first fixed terminal, and requests call to the portable terminal. Also, the communication unit 1002 requests calls through the 3G voice network by the number allocated to the portable terminal, requests calls through the WiFi network by the number allocated to the first fixed terminal, receives requests for forwarding calls connected to the portable terminal to the first fixed terminal from the first fixed terminal, and requests calls to the first fixed terminal. Also, the communication unit 1002 receives requests for forwarding calls connected to the first fixed terminal to the third fixed terminal form the first fixed terminal, and requests calls to the third fixed terminal.

The storage unit 1003 may include a program storage unit for storing a program for controlling an operation of the server, and a data storage unit for storing data generated during the execution of a program.

In the above block configuration, the control unit 1001 may perform an overall function of the server. The above configurations should be considered in descriptive sense only and not for the purpose of limitation, and those skilled in the art will understand that various changes may be made therein without departing from the scope of the present disclosure. For example, although the respective units are configured and illustrated separately, the control unit 1001 may be configured to perform all or some of the functions of the server.

As described above, embodiments of the portable terminal having the call forwarding function of the present disclosure can provide a user-based call forwarding function, thus making it possible to improve the convenience of users.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method to operate a portable terminal, the method comprising:
   detecting a distance between a first fixed terminal and the portable terminal during a call;
   comparing the distance with a predefined distance;
   displaying a message requesting to forward the call with a second fixed terminal from the portable terminal to the first fixed terminal when the distance is within the predefined distance;
   after the message is displayed, detecting a motion of the portable terminal;
   comparing the motion with a predefined motion; and
   transmitting a request to forward the call to the first fixed terminal when the motion is substantially the same as the predefined motion, wherein the motion is a posture of the portable terminal.

2. The method of claim 1, wherein the predefined distance is a distance between the portable terminal and the first fixed terminal capable of permitting near field communication between the portable terminal and the first fixed terminal.

3. The method of claim 1, wherein detecting the motion of the portable terminal comprises detecting a change in velocity of the portable terminal in real time using an acceleration sensor and a gyro sensor provided in the portable terminal.

4. The method of claim 1, wherein the predefined motion initiates a forwarding of the call with the second fixed terminal from the portable terminal to the first fixed terminal.

5. The method of claim 1, wherein transmitting the request to forward the call to the first fixed terminal comprises performing near field communication with the first fixed terminal to transmit the request for call forwarding to the first fixed terminal.

6. The method of claim 1, further comprising:
   receiving a call request from a server;
   receiving a command input to accept the call request; and
   receiving a forwarded call with the first fixed terminal and attempting another call with the second fixed terminal.

7. The method of claim 6, wherein receiving the call request from the server comprises at least one of:
   receiving the call request through a Third Generation (3G) voice network by a number allocated to the portable terminal; or
   receiving the call request through a WiFi network by a number allocated to the first fixed terminal.

8. The method of claim 1, further comprising:
   searching for a number of a third fixed terminal to which the call with the first fixed terminal engaged with the second fixed terminal is forwarded; and
   receiving a selection of the third fixed terminal that has been searched.

9. A method to operate a fixed terminal, the method comprising:
   receiving a request to forward the call from the portable terminal; and
   forwarding the call according to the request, wherein the request is received when a distance between a portable terminal and the fixed terminal is within a predefined distance, and a motion of the portable terminal, detected after the portable terminal displays a message requesting to transmit the request to forward the call to the fixed terminal, is substantially the same as a predefined motion, wherein the motion is a posture of the portable terminal.

10. The method of claim 9, wherein the predefined distance is a user defined distance and wherein the predefined distance is a distance between the portable terminal and the first fixed terminal capable of permitting near field communication between the first fixed terminal and the portable terminal.

11. The method of claim 9, wherein receiving the request to forward the call from the portable terminal comprises performing near field communication with the portable terminal to receive the call forwarding request from the portable terminal.

12. The method of claim 9, wherein the forwarding of the call according to the request comprises:
   transmitting the request to a server to connect a call with the fixed terminal to the portable terminal; and
   holding the call connected to the fixed terminal.

13. The method of claim 9, wherein the forwarding of the call according to the request comprises:
   transmitting the request from the server to receive a forwarding of the call with the portable terminal;
   receiving a call request from the server;
   receiving command input to accept the call request;
   receiving the forwarded call with the portable terminal; and
   attempting the call with another fixed terminal.

14. The method of claim 9, wherein the forwarding of the call according to the request comprises:
   transmitting the request to a server to connect a call with the fixed terminal to another portable terminal; and
   holding the call with the fixed terminal.

15. A portable terminal comprising:
   a communication module configured to transmit a request to forward a call; and
   a control unit configured to:
     detect a distance between a first fixed terminal and the portable terminal,
     display, via a display unit, a message that requests to forward the call with a second fixed terminal from the portable terminal to the first fixed terminal when the distance is within the predefined distance,
     detect a motion of the portable terminal while the message is displayed,
     compare the motion with a predefined motion, and
     transmit, via the communication module, the request to the first fixed terminal when the motion is substantially identical to the predefined motion, wherein the motion is a posture of the portable terminal.

16. The portable terminal of claim 15, wherein the predefined distance is a distance between the portable terminal and the first fixed terminal capable of permitting near field communication between the portable terminal and the first fixed terminal.

17. The portable terminal of claim 15, wherein the control unit is configured to detect a change in a velocity of the portable terminal in real time using an acceleration sensor and a gyro sensor of the portable terminal.

18. The portable terminal of claim 15, wherein the predefined motion initiates a forwarding of the call with a second fixed terminal from the portable terminal to the first fixed terminal.

19. The portable terminal of claim 15, wherein the communication module is configured to perform near field communication with the first fixed terminal to request the call forwarding to the first fixed terminal.

20. The portable terminal of claim 15, further comprising an input unit configured to receive a command input to accept a call request, and wherein the communication module is configured to receive the call request from a server, receive a forwarding of the call with the first fixed terminal, and attempt the call with a second fixed terminal.

21. The portable terminal of claim 20, wherein the communication module is configured to receive the call request through at least one of a Third Generation (3G) voice network by at least one of a number allocated to the portable terminal or a WiFi network by a number allocated to the first fixed terminal.

22. The portable terminal of claim 15, wherein the control unit is configured to search for a number of a third fixed terminal to which the call with the first fixed terminal engaged with a second fixed terminal is to forwarded; and
the input unit is configured to receive a selection of the third fixed terminal that has been searched.

23. A fixed terminal comprising:
a communication unit configured to receive a request to forward a call;
a control unit configured to receive, via the request, from a portable terminal, and forward the call according to the request, wherein the request is received when a distance between a portable terminal and the fixed terminal is within a predefined distance and a motion of the portable terminal, detected after the portable terminal displays a message requesting to transmit the request to forward the call to the fixed terminal, is substantially identical to a predefined motion, and wherein the motion is a posture of the portable terminal.

24. The fixed terminal of claim 23, wherein the predefined distance is a user defined distance and wherein the predefined distance is a distance between the portable terminal and the first fixed terminal capable of permitting near field communication between the first fixed terminal and the portable terminal.

25. The fixed terminal of claim 23, wherein the communication module is configured to perform near field communication with the portable terminal to receive the request from the portable terminal.

26. The fixed terminal of claim 23, wherein the control unit is configured to transmit, via the communication module, the request to a server to connect the call with the fixed terminal to the portable terminal and hold the call connected to the fixed terminal.

27. The fixed terminal of claim 23, wherein the control unit is configured to transmit, via the communication module, the request from the server to receive a forwarding of the call with the portable terminal, receive, via the communication module, a call request from the server, receive, via the communication module, a forwarding of the call with the portable terminal, and attempt the call with another fixed terminal.

28. The fixed terminal of claim 23, wherein the control unit is configured to transmit, via the communication module, the request to a server to connect the call with the fixed terminal to another portable terminal and hold the call with the fixed terminal.

29. The method of claim 1, wherein the predefined motion comprises moving the portable terminal vertically while holding the portable terminal horizontally.

30. The method of claim 9, wherein the predefined motion comprises moving the portable terminal vertically while holding the portable terminal horizontally.

31. The portable terminal of claim 15, wherein the predefined motion comprises moving the portable terminal vertically while holding the portable terminal horizontally.

32. The fixed terminal of claim 23, wherein the predefined motion comprises moving the portable terminal vertically while holding the portable terminal horizontally.

33. The method of claim 1, wherein the predefined motion comprises rotating the portable terminal in one of a clockwise direction or counterclockwise direction.

34. The method of claim 9, wherein the predefined motion comprises rotating the portable terminal in one of a clockwise direction or counterclockwise direction.

* * * * *